United States Patent Office 3,083,184
Patented Mar. 26, 1963

3,083,184
INTERPOLYMERIZATION OF CARBON MON-
OXIDE AND ALPHA-MONOOLEFINS
William E. Loeb, Martinsville, N.J., assignor to Union
Carbide Corporation, a corporation of New York
No Drawing. Filed Aug. 25, 1960, Ser. No. 51,785
8 Claims. (Cl. 260—63)

This invention relates to the reaction of carbon monoxide and alpha-monoolefins to produce solid polymers. More particularly, this invention relates to a process for the reaction of carbon monoxide and alpha-monoolefins at low pressures and temperatures.

Carbon monoxide has been polymerized with alpha-monoolefins at high temperatures and at high pressures in the presence of a catalyst capable of generating free radicals. In accordance with the instant invention, it has now been discovered that reaction between carbon monoxide and alpha-monoolefins can be effected at low temperature and pressure conditions by contacting the reactants with a catalyst composition consisting essentially of an inorganic halide salt of a transition metal of group IVA, VA, or VIA of the Periodic Chart of the Atoms and an organometallic compound of a metal of group IA, IIA, or IIIB of the Periodic Chart of the Atoms. Since it hitherto had been believed that carbon monoxide reacts with transition metal compounds and organometallic compounds and destroys their effectiveness to act as cocatalysts, it was surprising and unexpected that such compounds would polymerize carbon monoxide with alpha-monoolefins.

The polymers obtained by the process of the instant invention are characterized by high densities, and have a carbonyl content, as determined by infra-red analysis, of from about 0.01 to about 1.0 carbonyl group per thousand carbon atoms, or from about 0.002 mole percent to about 0.2 mole percent. Preferably such polymers have a carbonyl content of from about 0.05 to about 0.5 carbonyl group per thousand carbon atoms, or from about 0.01 mole percent to about 0.1 mole percent. The introduction of the stated amounts of carbonyl groups into the polymer improves the dyeability and printability thereof. These polymers can be employed in the many uses commonly made of polyolefin resins, such as in the production of films, coatings, molded articles and the like.

Polymerization between carbon monoxide and alpha-monoolefins can be effected by contacting a mixture of one or more alpha-monoolefins and carbon monoxide, containing from 0.1 mole percent to 80 mole percent, preferably from 0.2 mole per cent to 60 mole percent, of carbon monoxide, with a catalyst composition consisting essentially of an inorganic halide salt of a transition metal of group IVA, VA, or VIA of the Periodic Chart of the Atoms and an organometallic compound of a metal of group IA, IIA, or IIIB of the Periodic Chart of the Atoms. Polymerization can be effected by continuously bubbling the gaseous monomers through the catalyst composition, or by initially sealing a fixed amount of the gaseous monomers and the catalyst composition in a polymerization reactor and allowing the reaction to proceed under autogenous pressure with, if desired, further batchwise additions of monomer or catalyst components. In any event, reactive contact between the monomers and catalyst composition should be maintained by constant stirring or agitation of the reaction mixture in order to obtain maximum polymerization. Care should be taken to exclude air and moisture from contact with the reaction mixture since these substances interfere with polymerization by destroying the catalyst composition. Such can be accomplished by techniques well known in the art.

The alpha-monoolefins which can be polymerized with carbon monoxide according to the process of the instant invention are those olefins which have only a single ethylenically-unsaturated carbon-to-carbon linkage, and contain from two to about eight carbon atoms, preferably from two to five carbon atoms. Such compounds can be graphically depicted by the formula $$CH_2=CHR$$

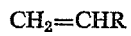

wherein R represents a hydrogen atom or an alkyl radical containing from one to about six carbon atoms. Illustrative of the alpha-monoolefins which can be polymerized with carbon monoxide in accordance with the process of this invention are such compounds as ethylene, propylene, 1-butene, 1-pentene, 1-hexene, 1-heptene, 1-octene, 3-methyl-1-butene, 4-methyl-1-pentene, 3-methyl-1-pentene, 3-methyl-1-hexene, 4-methyl-1-hexene and 3,4-dimethyl-1-hexene. Such compounds can be polymerized with carbon monoxide individually, or in combination so as to yield various interpolymers.

The first component of the catalyst compositions useful in polymerizing carbon monoxide with alpha-monoolefins is an organometallic compound of a metal of group IA, IIA, or IIIB of the Periodic Chart of the Atoms which can be represented by the general formula $$R_nM$$

wherein R represents a monovalent hydrocarbon radical free of aliphatic unsaturation having from one to about eighteen carbon atoms, including alkyl radicals such as methyl, ethyl, propyl, isopropyl, butyl, isobutyl, amyl, octadecyl and the like, and aryl radicals such as phenyl, tolyl, xylyl, naphthyl and the like; M represents a metal selected from the group consisting of the metals present in groups IA, IIA, and IIIB of the Periodic Chart of the Atoms; and $n$ is an integer having a value equal to the valence of M. Preferably R is an alkyl radical having from one to six carbon atoms. When in the general formula $n$ is greater than one, R can represent the same or different radicals. Illustrative of the organometallic compounds which can be employed in preparing the catalyst compositions useful in polymerizing carbon monoxide with alpha-monoolefins according to the process of the instant invention are triisobutylaluminum, trioctylaluminum, tri-n-butylaluminum, triethylaluminum, triisopropylaluminum, tridodecylaluminum, trioctadecylaluminum, diethylmethylaluminum, diethylisobutylaluminum, diisobutylethylaluminum, triphenylaluminum, tritolylaluminum, trixylylaluminum, trinaphthylaluminum, diethylberyllium, diisobutylberyllium, dioctylberyllium, didodecylberyllium, dioctadecylberyllium, methylethylberyllium, diphenylberyllium, ditolylberyllium, isobutyllithium, cyclohexyllithium, dodecyllithium, octadecyllithium, xylyllithium, naphthyllithium, diisobutylmagnesium, dioctylmagnesium, dioctadecylmagnesium, didodecylmagnesium, diphenylmagnesium and the like. These compounds can be employed individually or in various mixtures thereof.

The second component of the catalyst compositions useful in polymerizing carbon monoxide with alpha-monoolefins is an inorganic halide salt of a transition metal of group IVA, VA, or VIA of the Periodic Chart of the Atoms wherein the transition metal is at its maximum possible valency. Preferably the halide employed is a chloride, but fluorides, bromides, and iodides can also be employed. Typical examples of the transition metal halide salts which can be employed are such compounds as titanium tetrachloride, titanium tetrafluoride, titanium tetrabromide, titanium tetraiodide, vanadium pentachloride, vanadium pentabromide, vanadium pentafluoride, vanadium pentaiodide, niobium pentachloride, chromium hexachloride, chromium hexabromide, chromium hexaiodide, chromium hexafluoride, molybdenum hexachloride, molybdenum hexafluoride, molybdenum hexabromide, molybdenum hexaiodide, tungsten hexachloride, zirconium tetrachloride and the like. These compounds can be employed individually or in various mixtures thereof.

The organometallic compounds and transition metal halide salts employed in polymerizing carbon monoxide with alpha-monoolefins can be employed together in ratios varying over rather broad ranges. In general, molar ratios of organometallic compound to transition metal halide salt varying from about 0.1:1 to about 10:1 can be advantageously employed. Preferably, for efficiency and economy of operation, the ratio is maintained between 0.2:1 and 3:1.

The amount of catalyst composition employed in polymerizing carbon monoxide with alpha-monoolefins can vary over a wide range. In general, such catalyst composition should be employed in an amount of from about 0.1 percent by weight to about 20 percent by weight, preferably from 1 percent by weight to 10 percent by weight, of the total amount of carbon monoxide and alpha-monoolefins employed.

The catalyst compositions useful in polymerizing carbon monoxide with alpha-monoolefins are preferably employed for such purpose in an inert liquid hydrocarbon which serves as a diluent for the polymerization. By an "inert" liquid hydrocarbon is meant a liquid hydrocarbon which is nonreactive under the polymerization conditions employed in the process of the instant invention. While the hydrocarbons selected need not function as solvent for the catalyst composition or the polymers obtained by the process of the invention, they usually serve as solvent for the monomers employed in the polymerization. Among the inert liquid hydrocarbons applicable for such purpose may be mentioned saturated aliphatic hydrocarbons such as hexane, heptane, isooctane, highly purified kerosene and the like; saturated cycloaliphatic hydrocarbons such as cyclohexane, methylcyclohexane and the like; aromatic hydrocarbons such as benzene, toluene, xylene and the like; and chlorinated aromatic hydrocarbons such as chlorobenzene, orthodichlorobenzene and the like.

When an inert liquid hydrocarbon is employed as a diluent for the polymerization, the total amount of catalyst composition dispersed in such diluent can vary over a wide range. Suitable mixtures of catalyst composition and diluent can be prepared by dispersing sufficient amounts of catalyst composition in the diluent to provide a concentration of from 0.05 percent by weight to 5 percent by weight, preferably from 0.5 percent by weight to 1 percent by weight, of such catalyst composition in the admixture.

Polymerization according to the process of the instant invention readily occurs at temperatures ranging from as low as 10° C. to as high as 200° C., but is preferably effected at temperatures ranging from about 50° C. to about 140° C. The pressures employed in effecting polymerization according to the process of the instant invention can vary over a wide range. As a matter of convenience polymerization is usually effected under atmospheric pressure; however, pressures both above and below atmospheric pressure, for example pressures ranging from as low as 0.2 atmosphere to as high as 100 atmospheres, can also be employed whenever it is desirable to do so.

After the polymerization reaction is complete, the catalyst composition can be inactivated by the addition thereto of a suitable quenching agent, such as, for example, water, or an alcohol such as isopropanol. The polymer formed by the reaction can then be separated from the reaction mixture by conventional procedures well known in the art. Catalyst residues can be removed from the polymer by washing with suitable solvents, such as, for example, water, or an alcohol such as isopropanol.

The term "stiffness," as employed throughout this specification, refers to the secant modulus of elasticity of a polymer as measured on an Instron tester. This tester is manufactured by the Instron Engineering Company of Quincy, Mass. (Model TTB). The stiffness modulus is calculated by multiplying by 100 the force in pounds per square inch necessary to stretch a sample of the polymer, having a cross-sectional area of one square inch, one percent of its original length at a rate of one percent per minute.

The term "melt index," as employed throughout this specification, is the rate at which a polymer is extruded through a die having a diameter of 0.0825 inch in accordance with the procedure described in ASTM test procedure D-1238-52T. Polymers of high molecular weight extrude more slowly and therefore have a lower melt index.

The carbonyl content of the polymers obtained by the process of the instant invention was determined by infrared analysis. A sample of the polymer was compression molded into a plaque 0.036±0.002 inch thick, and the plaque was scanned in a Double-Beam Model 13 Perkins-Elmer infra-red spectrophotometer over the 2 to 15 micron range. The absorbence value of the band at 5.8 microns was employed in determining the carbonyl content of the polymer according to the equation:

Carbonyl groups per thousand carbon atoms $$= \frac{\text{absorbence at 5.8 microns} \times 26}{\text{thickness of plaque in mils}}$$

Unless otherwise specified, all parts and percentages, as used throughout this specification, are by weight. The Periodic Chart of the Atoms referred to throughout this specification is the 1956 revised edition published by W. M. Welch Manufacturing Company, 1515 Sedgwick Street, Chicago, Illinois, U.S.A.

The following examples are set forth for purposes of illustration so that those skilled in the art may better understand this invention, and it should be understood that they are not to be construed as limiting this invention in any manner.

*Example I*

Into a nitrogen-purged three-liter polymerization reactor equipped with a stirrer, a thermowell with thermocouple, three inlet tubes and an exhaust tube, there were charged, in the order stated, 100 milliliters of anhydrous isooctane, 2.75 milliliters of titanium tetrachloride (0.025 mole), 2.55 milliliters of triisobutylaluminum (0.010 mole), and 900 additional milliliters of anhydrous isooctane. The mixture was stirred and heated at 50° C. in the absence of air while a gaseous mixture of ethylene and carbon monoxide, containing 1.27 mole percent carbon monoxide, was sparged through at the rate of two cubic feet per hour. The reaction was allowed to proceed for one hour during which time a total of about 65 grams of ethylene and 0.86 gram of carbon monoxide was fed into the reactor. At the end of this time, the flow of monomer was discontinued, and one liter of distilled water was added to the mixture to inactivate the catalyst. The contents of the reactor was then transferred to a separatory funnel, the water layer was drained, and the remaining isooctane-resin slurry was sparged with steam in a steam distillation apparatus until all the isooctane had been removed. The resulting resin-water slurry was then filtered to separate the ethylene-carbon monoxide copolymer. The ethylene-carbon monoxide copolymer was dried by heating at 60° C. in a forced draught oven. The dried ethylene-carbon monoxide copolymer weighed 55 grams. This represented a yield of 83 percent of theoretical. The ethylene-carbon monoxide copolymer had a melt index of 11.2 decigrams per minute, and a stiffness of 66,000 p.s.i. at 135° C. The carbonyl content of the copolymer, as determined by infra-red analysis, was 0.145 carbonyl group per thousand carbon atoms, or 0.029 mole percent.

When the procedure was repeated employing ethylene but no carbon monoxide, 58 grams of polyethylene were recovered, representing a yield of 89 percent of theoretical. The polyethylene had a melt index of 2.8 decigrams per minute, and a stiffness of 68,000 p.s.i. at 135° C. Infra-red analysis indicated that the polymer had no carbonyl content.

*Example II*

The polymerization procedure described in Example I was repeated except that a monomer mixture containing 0.17 mole percent carbon monoxide was employed, and a total of 65 grams of ethylene and 0.12 gram of carbon monoxide was fed into the reactor. Fifty-eight grams of ethylene-carbon monoxide copolymer was recovered, representing a yield of 89 percent of theoretical. The ethylene-carbon monoxide copolymer had a melt index of 6.2 decigrams per minute, and a stiffness of 69,000 p.s.i. at 135° C. The carbonyl content of the copolymer, as determined by infra-red analysis, was 0.064 carbonyl group per thousand carbon atoms, or about 0.013 mole percent.

*Example III*

The polymerization procedure described in Example I was repeated except that a monomer mixture containing 0.328 mole percent carbon monoxide was employed, and a total of about 65 grams of ethylene and 0.21 gram of carbon monoxide was fed into the reactor. Fifty-seven grams of ethylene-carbon monoxide copolymer were recovered, representing a yield of 87 percent of theoretical. The ethylene-carbon monoxide copolymer had a melt index of 5.3 decigrams per minute, and a stiffness of 75,000 p.s.i. at 135° C. The carbonyl content of the copolymer, as determined by infra-red analysis, was 0.070 carbonyl group per thousand carbon atoms, or about 0.014 mole percent.

*Example IV*

The polymerization procedure described in Example I was repeated except that a monomer mixture containing 0.632 mole percent carbon monoxide was employed, and a total of 65 grams of ethylene and 0.4 gram of carbon monoxide was fed into the reactor. Fifty-seven grams of ethylene-carbon monoxide copolymer were recovered, representing a yield of 87 percent of theoretical. The ethylene-carbon monoxide copolymer had a melt index of 11.3 decigrams per minute, and a stiffness of 80,000 p.s.i. at 135° C. The carbonyl content of the copolymer, as determined by infra-red analysis, was 0.081 carbonyl group per thousand carbon atoms, or about 0.016 mole percent.

*Example V*

The polymerization procedure described in Example I was repeated except that a monomer mixture containing 1.25 mole percent carbon monoxide was employed, and a total of 64 grams of ethylene and 0.8 gram of carbon monoxide was fed into the reactor. Fifty-seven grams of ethylene-carbon monoxide copolymer were recovered, representing a yield of 88 percent of theoretical. The ethylene-carbon monoxide copolymer had a melt index of 30.5 decigrams per minute, and a stiffness of 72,000 p.s.i. at 135° C. The carbonyl content of the copolymer, as determined by infra-red analysis, was 0.156 carbonyl group per thousand atoms, or about 0.031 mole percent.

*Example VI*

The polymerization procedure described in Example I was repeated except that a monomer mixture containing 7.1 mole percent carbon monoxide was employed, and a total of 61 grams of ethylene and 4.6 grams of carbon monoxide was fed into the reactor. Forty-four grams of ethylene-carbon monoxide copolymer were recovered, representing a yield of 67 percent of theoretical. The ethylene-carbon monoxide copolymer had a melt index of 24.0 decigrams per minute, and a stiffness of 72,000 p.s.i. at 135° C. The carbonyl content of the copolymer, as determined by infrared analysis, was 0.243 carbonyl group per thousand carbon atoms, or about 0.049 mole percent.

*Example VII*

The polymerization procedure described in Example I was repeated except that a monomer mixture containing 30 mole percent carbon monoxide was employed, and a total of 46 grams of ethylene and 19 grams of carbon monoxide was fed into the reactor. Thirty-seven grams of ethylene-carbon monoxide copolymer were recovered, representing a yield of 57 percent of theoretical. The ethylene-carbon monoxide copolymer had a melt index of 29 decigrams per minute, and a stiffness of 80,000 p.s.i. at 135° C. The carbonyl content of the copolymer, as determined by infra-red analysis, was 0.329 carbonyl group per thousand carbon atoms, or about 0.06 mole percent.

*Example VIII*

The polymerization procedure described in Example I was repeated except that a monomer mixture containing 58 mole percent carbon monoxide was employed, and a total of 27.5 grams of ethylene and 37.5 grams of carbon monoxide was fed into the reactor. Twenty-one grams of ethylene-carbon monoxide copolymer were recovered, representing a yield of 32 percent of theoretical. The ethylene-carbon monoxide copolymer had a melt index of 67 decigrams per minute. The carbonyl content of the copolymer, as determined by infra-red analysis, was 0.517 carbonyl group per thousand carbon atoms, or about 0.1 mole percent.

Copolymers of carbon monoxide and propylene are produced in a manner similar to the procedures of Examples I through VIII by substituting propylene for ethylene, and by employing catalyst compositions consisting of triethylaluminum and vanadium pentachloride, triisopropylaluminum and chromium hexachloride, triphenylaluminum and molybdenum hexachloride, diethylberyllium and molybdenum hexachloride, octadecyllithium and tungsten hexachloride, and diphenylmagnesium and zirconium tetrachloride.

What is claimed is:

1. A process for producing interpolymers of carbon monoxide and at least one alpha-monoolefin which comprises contacting, at a temperature of from 10° C. to 200° C. under a pressure of from 0.2 atmosphere to 100 atmospheres, a mixture of carbon monoxide and at least one alpha-monoolefin containing from two to about eight carbon atoms, said mixture containing from 0.1 mole percent to 80 mole percent of carbon monoxide, with a catalyst composition consisting essentially of an organometallic compound represented by the general formula:

$$R_nM$$

wherein R is a monovalent hydrocarbon radical free of aliphatic unsaturation having from one to about eighteen carbon atoms; M is a metal selected from the group consisting of the metals present in groups IA, IIA, and IIIB of the Periodic Chart of the Atoms; and $n$ is an integer having a value equal to the valence of M; and an inorganic halide salt of a metal selected from the group consisting of the transition metals present in groups IVA, VA, and VIA of the Periodic Chart of the Atoms wherein the transition metal is at its maximum possible valency.

2. A process for producing interpolymers of carbon monoxide and at least one alpha-monoolefin which comprises contacting, at a temperature of from 10° C. to 200° C. under a pressure of from 0.2 atmosphere to 100 atmospheres, a mixture of carbon monoxide and at least one alpha-monoolefin containing from two to five carbon atoms, said mixture containing from 0.2 mole percent of 60 mole percent of carbon monoxide, with a catalyst composition consisting essentially of an organometallic compound represented by the general formula:

$$R_nM$$

wherein R is an alkyl radical having from one to six carbon atoms; M is a metal selected from the group consisting of the metals present in groups IA, IIA, and IIIB of the Periodic Chart of the Atoms; and $n$ is an integer having a value equal to the valence of M; and an inorganic chloride salt of a metal selected from the group consisting of the transition metals present in Groups IVA, VA, and VIA of the Periodic Chart of the Atoms wherein the transition metal is at its maximum possible valency.

3. A process as in claim 1 wherein the alpha-monoolefin is ethylene.

4. A process as in claim 2 wherein the alpha-monoolefin is ethylene.

5. A process as in claim 3 wherein the inorganic halide salt is titanium tetrachloride.

6. A process as in claim 4 wherein the inorganic chloride salt is titanium tetrachloride.

7. A process for producing copolymers of carbon monoxide and ethylene which comprises contacting, at a temperature of from 10° C. to 200° C. under a pressure of from 0.2 atmosphere to 100 atmospheres, a mixture of carbon monoxide and ethylene, said mixture containing from 0.1 mole percent to 80 mole percent of carbon monoxide, with a catalyst composition consisting essentially of triisobutylaluminum and titanium tetrachloride.

8. A process for producing copolymers of carbon monoxide and ethylene which comprises contacting, at a temperature of from 10° C. to 200° C. under a pressure of from 0.2 atmosphere to 100 atmospheres, a mixture of carbon monoxide and ethylene, said mixture containing from 0.2 mole percent to 60 mole percent of carbon monoxide, with a catalyst composition consisting essentially of triisobutylaluminum and titanium tetrachloride.

References Cited in the file of this patent

UNITED STATES PATENTS

| | | |
|---|---|---|
| 2,495,286 | Brubaker | Jan. 24, 1950 |
| 2,641,590 | Little | June 9, 1953 |
| 2,652,372 | Farlow et al. | Sept. 15, 1953 |
| 2,837,587 | Hogan et al. | June 3, 1958 |
| 2,943,063 | Eby et al. | June 28, 1960 |

FOREIGN PATENTS

| | | |
|---|---|---|
| 533,362 | Belgium | May 16, 1955 |